United States Patent [19]

Wallman et al.

[11] Patent Number: 5,409,615
[45] Date of Patent: Apr. 25, 1995

[54] TEMPERATURE CONTROLLED GREASE TRAP

[75] Inventors: Lloyd Wallman, Vancouver; Leon B. Watts, Surrey, both of Canada

[73] Assignee: Le-Ron Plastics, Inc., Surrey, Canada

[21] Appl. No.: 119,409

[22] Filed: Sep. 9, 1993

Related U.S. Application Data

[63] Continuation-in-part of Ser. No. 915,464, Jul. 16, 1992, abandoned.

[51] Int. Cl.⁶ .............................................. B01D 21/30
[52] U.S. Cl. .................................. 210/742; 137/3; 137/87; 165/34; 210/149; 210/187; 236/12.14
[58] Field of Search ................. 137/3, 87; 165/13, 32, 165/34; 236/12.11, 12.12, 12.14, DIG. 8; 422/622, 109; 210/149, 175, 187, 539, 612, 614, 742, 774, 916

[56] References Cited

U.S. PATENT DOCUMENTS

| | | | |
|---|---|---|---|
| 1,170,614 | 2/1916 | Darwin et al. | 236/12.11 |
| 1,851,172 | 3/1932 | Gordon | 210/149 |
| 1,970,123 | 8/1934 | Boosey | 210/539 |
| 1,977,305 | 10/1934 | Dehn | 2110/539 |
| 2,348,670 | 5/1944 | Woodward | 210/149 |
| 2,935,197 | 5/1960 | Marple | 210/149 |
| 3,184,686 | 5/1965 | Stanton | 236/DIG. 8 |
| 3,190,301 | 6/1965 | Hackman | 236/DIG. 8 |
| 4,113,617 | 9/1978 | Bereskin et al. | 210/742 |
| 4,268,396 | 5/1981 | Lowe | 210/742 |
| 4,797,208 | 1/1989 | Miller et al. | 210/632 |
| 4,940,539 | 7/1990 | Weber | 210/149 |

*Primary Examiner*—Joseph W. Drodge
*Attorney, Agent, or Firm*—Oyen Wiggs Green & Mutala

[57] ABSTRACT

Apparatus is disclosed for maintaining the temperature of waste water entering a grease trap below a preset temperature. The apparatus is useful to prevent grease which has collected in the grease trap from being washed into the sewer system by persons attempting to flush the grease from the trap with hot water. A temperature sensor monitors the temperature of waste water flowing into the grease trap. Cold water is introduced directly into the waste water conduit, upstream of the trap, through a valve controllably coupled to the temperature sensor whenever the temperature of waste water in the waste water conduit exceeds a threshold temperature.

18 Claims, 3 Drawing Sheets

TEMPERATURE CONTROLLED GREASE TRAP

This is a continuation-in-part of U.S. patent application No. 07/915,464 filed 16 Jul, 1992, now abandoned.

FIELD OF THE INVENTION

This invention relates to an apparatus and a method for maintaining the temperature of waste water entering a grease trap below a preset temperature to prevent grease collected in the trap from being washed out of the trap into the sewer system.

BACKGROUND OF THE INVENTION

Grease traps are commonly used to separate greases from the waste water exiting a kitchen. Collecting greases in a grease trap prevents the greases from flowing into the sewer system where the greases may cause problems by congealing in the sewer pipes or interfering with sewage treatment.

Grease traps are commonly installed in restaurant kitchens. In fact, the law in some jurisdictions requires restaurant kitchens to be equipped with grease traps. Such traps are installed in the main drain conduit which carries waste water from the kitchen to the sewer system. The trap separates greases from the waste water leaving the restaurant kitchen and retains the collected greases in a semi-congealed state. Eventually, the trap reaches its capacity, at which point the grease which has accumulated in the trap must be removed and disposed of. If the grease is not removed when the grease trap is full, then the passage of waste water through the trap becomes impeded by excess grease which congeals within the passages inside the trap. This may cause the drains in the restaurant kitchen to back up.

Restaurant kitchen workers typically discover that the chore of removing accumulated grease from a grease trap can be avoided by running hot water through the grease trap. The hot water melts the grease which has congealed within the trap and flushes the grease into the sewer system. This obviously defeats the purpose of the grease trap, which is to prevent grease from entering the sewer system.

The prior art discloses some grease traps which have built-in cooling systems. The main purpose of such cooling systems is apparently to aid in the separation of grease from waste water. Grease tends to separate more easily from cool waste water than from warm waste water. Most grease traps are, therefore, more efficient at removing grease from the waste water stream when the waste water inside the grease trap is cool than they are when the waste water is warm or hot.

Cooled grease traps as disclosed in the prior art may be partially effective to prevent grease which has already accumulated within such traps from being flushed out of such traps by hot waste water. The following are examples of prior art cooled grease traps.

U.S. Pat. No. 1,851,172 Gordon, discloses a grease trap having a cooling jacket for maintaining the inner walls of the grease trap at a low temperature. The cooling jacket may be cooled by means of refrigerating coils within the cooling jacket or by passing cold water through the cooling jacket.

U.S. Pat. No. 1,970,123 Boosey, discloses a grease trap in which a portion of the wall of the grease trap is cooled by cold water flowing in an external circuit.

U.S. Pat. No. 1,977,305 Dehn, discloses another variety of water cooled grease trap having a cooling jacket which is separate from the grease trap itself and which is adapted to be placed in contact with the outside of the grease trap.

A disadvantage of the cooling systems used in these prior art grease traps is that they cannot be retrofitted to previously installed grease traps. They are also expensive to make because they use either expensive refrigerator systems or isolated cold water cooling circuits. Where cold water is used as a coolant, all of these prior art systems take pains to isolate the cold water coolant from the waste water inside the grease trap. This creates complications in plumbing.

U.S. Pat. No. 4,113,617 Bereskin et al. describes a grease trap of particular design in which incoming waste water flows in a thin film through an inlet chamber before passing into the main grease collection chamber of the grease trap. In the inlet chamber the thin film of waste water is cooled by spraying cold water over its surface from multiple overhead spray heads. Waste water from the inlet chamber passes through baffles directly into the grease collection chamber. Further cooling is provided by sucking steam and heated vapours out from above the water in the inlet chamber and grease trap through a fan-forced exhaust manifold.

The cold water spray heads in the Bereskin et al. device are activated by a temperature sensor which is situated downstream from the inlet chamber below the static water level in the grease trap in a pool of water which is permanently retained within the grease trap. Due to the thermal inertia of the water retained in the grease trap the temperature sensor in the Bereskin et al. device cannot react immediately to changes in the temperature of the incoming waste water. Furthermore, because it is downstream from the cooling spray heads the temperature sensor does not sense directly the temperature of the incoming waste water.

The Bereskin et al. grease trap is complicated and therefore relatively expensive to manufacture. It requires a fan-driven exhaust manifold to the outside and an electrical supply to operate optimally which each require installation, possibly by separate tradesmen. The Bereskin et al. grease trap must be relatively large because the inlet chamber must be big enough to allow the incoming waste water to flow in a film. The Bereskin et al. cooling apparatus cannot be retrofitted to an existing grease trap.

A further disadvantage of all of these prior art systems is that no provision is made for cooling waste water before it enters the grease trap. If the waste water is hot and flowing at a high volume then it may not remain in the grease trap long enough to cool down even if the walls of the grease trap are cooled. Therefore, the cooling effect may not be sufficient to prevent accumulated greases from being flushed out of these prior art grease traps by high volume streams of hot waste water.

SUMMARY OF THE INVENTION

The present invention provides apparatus for cooling a stream of waste water flowing into a grease trap by adding cold water directly to the waste water stream before it enters the grease trap. As the cold water is added to the waste water conduit before the waste water enters the grease trap the apparatus of the present invention may be retrofitted to an existing grease trap without modifying the grease trap itself. The apparatus according to the present invention provides a valve for increasing the flow of cold water into the waste water conduit whenever the temperature of the waste water entering the waste water conduit exceeds a threshold temperature. Therefore, no cold water is consumed unless it is needed to cool the incoming waste water.

Another advantage of the present invention is that the cold water may be injected into the waste water conduit before it enters the grease trap so that the waste water is already cool when it enters the grease trap.

Accordingly, the present invention provides an apparatus for maintaining below a threshold temperature, the temperature of waste water entering a grease trap from a waste water line. The apparatus comprises:

(a) a waste water pipe connected between a source of waste water, such as a restaurant kitchen sink, and an inlet of a grease trap;

(b) a temperature sensor in thermal communication with a point in the interior of the waste water pipe, upstream from the grease trap inlet, for sensing the temperature of the waste water at the point;

(c) a cold water supply conduit connectable to a cold water supply;

(d) a normally closed valve connected between the cold water supply conduit and the waste water pipe for controllably introducing cold water from the cold water supply into the waste water pipe; and (e) control means associated with the temperature sensor and the valve for opening the valve whenever the temperature of the waste water at the point exceeds said threshold temperature.

The present invention also provides a method for maintaining the temperature of waste water entering a grease trap from a waste water conduit below a threshold temperature. The method comprises the steps of:

(a) measuring the temperature of waste water at a point in a waste water pipe;

(b) adding cold water into the waste water pipe downstream from the point whenever the temperature measured in step (a) exceeds the threshold temperature; and (c) allowing the cold water to mix with the waste water in the waste water pipe before entering the grease trap.

BRIEF DESCRIPTION OF THE DRAWINGS

An embodiment of the invention will now be described by way of example with reference to the following drawing in which.

DETAILED DESCRIPTION OF THE PREFERRED EMBODIMENT OF THE INVENTION

Figure 1:
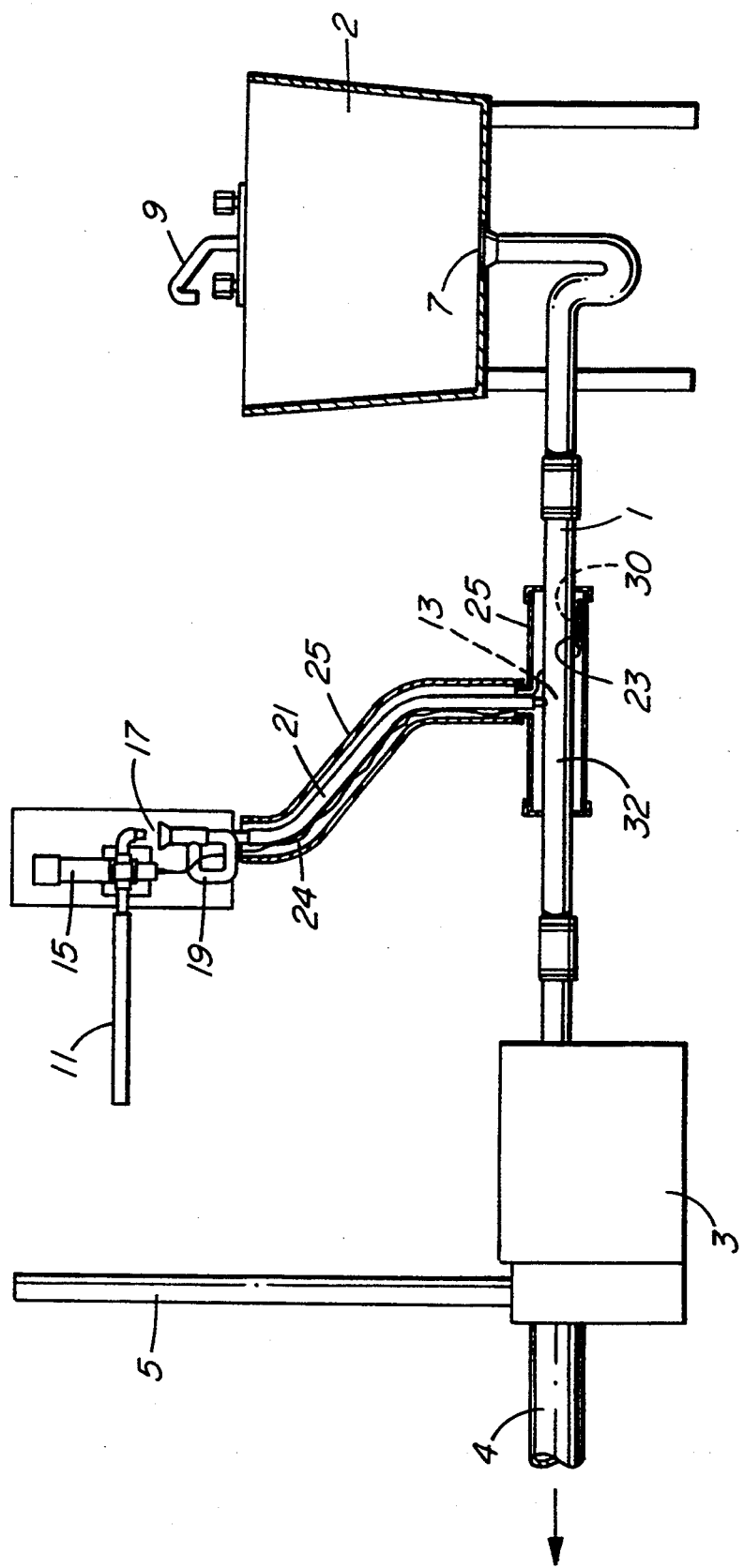
FIG. 1 is schematic diagram of a kitchen waste water disposal system having a temperature controlled grease trap in accordance with the present invention.
Figure 2:
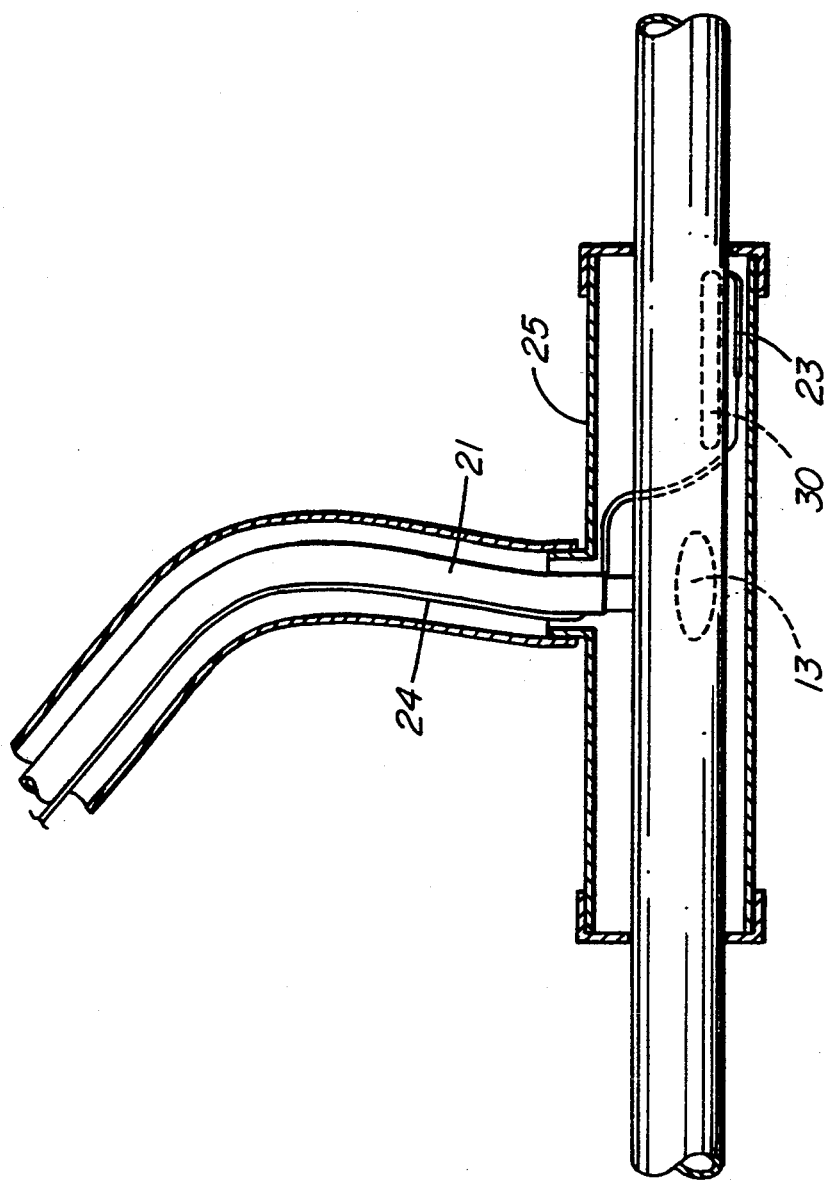
FIG. 2 is a schematic diagram of the portion of the system of FIG. 1 in the vicinity of the point where cold water is added to the waste water conduit.

FIG. 1 depicts a waste water conduit 1, which is most typically a standard drain pipe, extending between a kitchen sink 2 and a grease trap 3. Water drains from sink 2 through drain 7 into waste water conduit 1, through grease trap 3 to outlet conduit 4. Outlet conduit 4 is coupled into the sewer system (not shown). Grease trap 3 is typically equipped with a vent pipe 5 for venting sewer gases which may accumulate in grease trap 3 to the atmosphere. As the waste water flows through grease trap 3, greases entrained in the flow of waste water are retained by grease trap 3. Grease trap 3 may be any of the numerous types of grease trap which are well known in the prior art and which are less efficient at separating and retaining greases from hot waste water than from cold waste water.

When grease trap 3 becomes full of grease it must be emptied. Otherwise, the flow of waste water through grease trap 3 to outlet conduit 4 will be impeded by excess grease, causing drain 7 to back up.

Restaurant workers faced with the chore of emptying grease trap 3 of accumulated grease typically discover that grease accumulated in grease trap 3 can be flushed out of the trap by running hot water from tap 9 through drain 7 and waste water conduit 1 into grease trap 3. The hot water melts the grease which has congealed inside grease trap 3 and flushes it through outlet conduit 4 into the sewer system.

The present invention provides a means for keeping grease trap 3 cool by introducing cold water directly into waste water conduit 1 whenever the temperature of the waste water flowing toward grease trap 3 in conduit 1 exceeds a threshold temperature. To this end, cold water supply conduit 11 is connected to a source of cold water (not shown). Cold water supply conduit 11 is most typically a standard water supply pipe. Cold water supplied through cold water supply conduit 11 flows into waste water conduit 1 through conduit 21, which is also, preferably, a standard water supply pipe, and mixes with the warmer waste water inside waste water conduit 1 at junction 13. The cold water cools the waste water in waste water conduit 1 so that by the time the mixture of waste water and cold water reaches grease trap 3 the mixture's temperature is too low to melt the grease congealed within grease trap 3.

The flow of waste water from cold water supply conduit 11 to waste water conduit 1 is regulated by valve 15. After passing through valve 15, cold water from cold water supply conduit 11 passes through air gap 17. Air gap 17 prevents cold water supply conduit 11 from being contaminated by waste water which could back up through waste water conduit 1 through conduit 21 if waste water conduit 1 became blocked down stream from junction 13. Air gap 17 is preferably between 2.5 cm and 4 cm wide. The lower side of air gap 17 is preferably located above the top edge of sink 2 so that if waste water conduit 1 or grease trap 3 becomes plugged, causing the waste in waste water conduit 1 to back up, the waste water will back up into sink 2 before it flows out through air gap 17. A restaurant employee is much more likely to notice water backing up into or overflowing from sink 2, which is located in the restaurant kitchen, than he or she is to notice water flowing out from air gap 17, which may be located in a back room.

After passing through air gap 17 the cold water passes through a trap 19 and then flows through conduit 21 into waste water conduit 1. Trap 19 prevents odorous gases in waste water conduit 1 from escaping through air gap 17. Trap 19 may be an odour prevention trap such as a siphon trap or, generally, any trap capable of maintaining a water seal to block the passage of gases from waste water conduit 1 to air gap 17.

Valve 15 is controlled by a temperature sensor 23 which is preferably in contact with the exterior of waste water conduit 1. Temperature sensor 23 may also be located inside waste water conduit 1 where it will be in direct contact with waste water flowing through water conduit 1. However, this requires a hole to be made through a wall of waste water conduit 1 which complicates the installation of temperature sensor 23.

Temperature sensor 23 is preferably positioned upstream from the point at which conduit 21 enters waste water conduit 1 so that the temperature measured by temperature sensor 23 depends on the temperature of the waste water flowing through waste water conduit 1 and is not affected by the introduction of cold water into waste water conduit 1 through conduit 21.

Valve 15 is off when temperature sensor 23 is cool and opens as the temperature sensed by temperature sensor 23 increases past a preset threshold temperature. The threshold temperature is set at a temperature low enough so that grease inside grease trap 3 does not melt when the water flowing into grease trap 3 from waste water conduit 1 is at the threshold temperature.

Of course, the temperature at sensor 23 will not be exactly the same as the temperature of the waste water flowing in waste water conduit 1 because sensor 23 is outside of waste water conduit 1 and the wall of waste water conduit 1 does not conduct heat instantaneously from the inside of waste water conduit 1 to sensor 23. The portion of waste water conduit 1 in contact with temperature sensor 23 is preferably copper or some other material having good thermal conductivity so that fluctuations in the temperature of waste water flowing through waste water conduit 1 are rapidly detected by sensor 23. If waste water conduit 1 is made from a thermally insulating material, then a length of waste water conduit 1 at the location of temperature sensor 23 is preferably replaced with a section of conduit having a high thermal conductivity. For example, a shod section of conduit 1 could be replaced with a length copper pipe.

Figure 3:
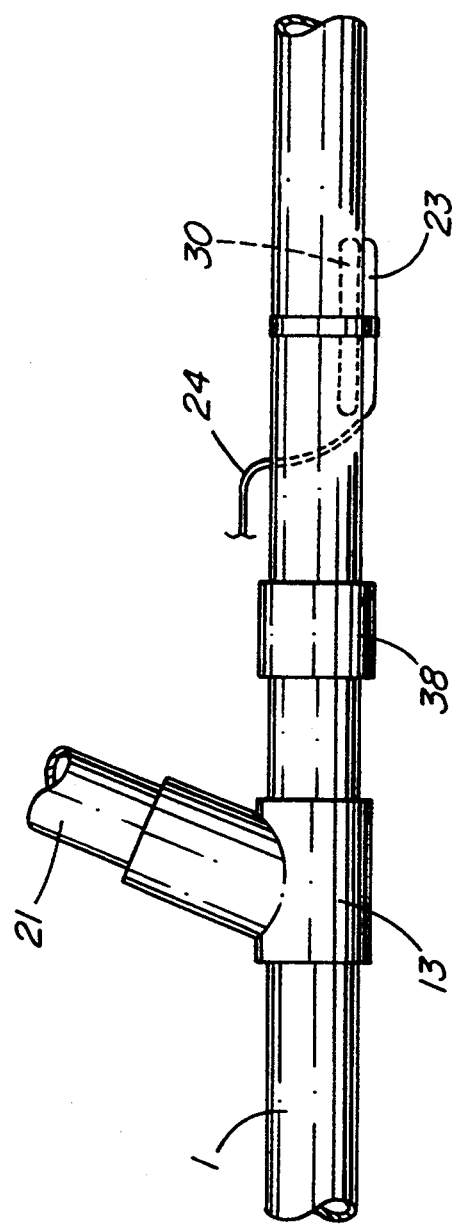
FIG. 3 is a schematic diagram of an alternative embodiment of the invention.

As shown in FIG. 3, in an alternative embodiment of the invention, a section 38 of waste water conduit 1 between temperature sensor 23 and mixing point 13 is not thermally conductive so that the temperature sensed by temperature sensor 23 is not significantly affected by any cold water which is being introduced to waste water conduit 1 at point 13.

Temperature sensor 23 produces a control signal representative of the temperature of the water flowing in the portion of waste water conduit 1 contacted by temperature sensor 23. The control signal is coupled to valve 15 by control line 24.

Temperature sensor 23 may be an electronic temperature sensor, in which case control line 24 could form part of an electrical circuit and valve 15 could be electrically controlled in response to an electrical control signal passed via control line 24. One disadvantage of using electrical means to control and operate valve 15 is that a source of electrical power is required to turn valve 15 on and off. Restaurant employees may be able to defeat a system in which valve 15 is electrically operated by shutting off electrical power to the apparatus.

Sensor 23 preferably controls valve 15 by non-electrical means. For example, valve 15 and sensor 23 may be the sensor and valve components of a model AVT-A thermostatic water valve manufactured by Danfoss Inc. of Mahwah, N.J. In this case, control line 24 is a thin tube and the control signal takes the form of a change in pneumatic pressure within control line 24. Any control means capable of operating valve 15 in response to changes in the temperature detected by sensor 23 so as to tend to maintain the temperature of water entering grease trap 3 through waste water conduit 1 below a threshold temperature comes within the scope of the invention.

A shield 25 is provided around sensor 23 and control line 24 to prevent tampering with sensor 23 or control line 24.

The action of valve 15 can be delayed so that cold water continues to flow during a time interval of a few seconds after the temperature sensed at sensor 23 drops from a temperature above the pre-set threshold temperature to a temperature below the threshold temperature. It has been found that an interval on the order of 17 seconds between the time that the temperature sensed at sensor 23 drops from a temperature above the threshold temperature to a temperature below the threshold temperature and the time that valve 15 closes produces good results. Where valve 15, control line 24, and sensor 23 are all parts of a Danfoss Model AVT-A thermostatic water valve a suitable delay is provided by the combined reaction time of valve 15, sensor 23 and control line 24. With other types of valve and control system a discrete timer subsystem may be included to provide a suitable delay.

Valve 15 may be set to open when temperature sensor 23 senses a first pre-set temperature and to stay open until the temperature sensed by temperature sensor 23 is at a second pre-set temperature which is lower than the first pre-set temperature. This is another way to ensure that the flow of cooling water into waste water conduit 1 continues slightly after hot waste water stops flowing into waste water conduit 1.

Valve 15 may operate so that it is either fully on or fully off but preferably opens in proportion to the difference between the temperature sensed by sensor 23 and the threshold temperature. In this way, if a large volume of hot water is suddenly introduced into waste water conduit 1 from sink 2 the temperature at sensor 23 will rise rapidly to a temperature well above the threshold temperature and valve 15 will respond by opening fully. On the other hand, if the water flowing from sink 2 into waste water conduit 1 is only slightly warmer than the threshold temperature or if only a small volume of water is flowing from sink 2 into waste water conduit 1 the temperature of water entering grease trap 3 can be maintained below the desired temperature with valve 15 opened a fractional amount, enough to cool the hot water flowing in waste water conduit 1 to prevent the melting of grease congealed within grease trap 3.

In a typical installation, the water temperature at point 30 in waste water conduit 1 upstream from mixing junction 13 may be 150° Fahrenheit and the temperature at point 32 downstream from cold water mixing point 13 may be only 80° Fahrenheit. The apparatus may be easily installed for use with previously installed grease traps of various sizes and capacities.

To retrofit the apparatus to an existing grease trap fed by a waste water pipe, all that is required is to cut the waste water pipe at a point upstream from the grease trap, insert a T fitting in the waste water conduit for attachment of conduit 21, install temperature sensor 23 and connect the apparatus to a cold water supply line 11. It is not necessary to modify the existing grease trap and, in the preferred embodiment of the invention, no electrical wiring is needed to install the apparatus.

The diameter of cold water supply conduit 11, and conduit 21, the width of air gap 17 and the configuration and size of trap 19 can all be varied in ways which are generally known in the plumbing trade to create an installation appropriate for a particular site. In a typical restaurant kitchen, waste water conduit 1 is a 2 inch diameter drain pipe and conduit 21 is a ¾ inch diameter water line. With a cold water pressure of approximately 70 pounds per square inch, which is typical in a restaurant kitchen, the maximum rate of flow of cold water through conduit 21 is approximately 7.5 to 8 gallons per minute.

As an alternative to introducing cold water into waste water conduit 1, cold water may be introduced directly into grease trap 3. This configuration is not preferred generally, because it does not cool the waste water before it enters the trap but may be useful in certain installations where space is limited.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. Apparatus for preventing greasy substances in waste water from reaching a sewer, said apparatus comprising:
   (a) a source of waste water contaminated with greasy substances;
   (b) a grease trap spaced away from said source of waste water;
   (c) a waste water pipe having an upstream end in fluid communication with said source of waste water and a downstream end in fluid communication with an inlet of said grease trap;
   (d) a temperature sensor in thermal communication with a sensing point above a static water level of said grease trap inside said waste water pipe, upstream from said inlet, for sensing the temperature of said waste water at said sensing point;
   (e) a cold water supply conduit connectable to a cold water supply;
   (f) a normally closed valve connected between said cold water supply conduit and said waste water pipe for controllably introducing cold water from said cold water supply into said waste water pipe at a mixing area sufficiently far upstream from said grease trap to allow said cold water to mix with said waste water before entering said grease trap; and
   (g) control means associated with said temperature sensor and said valve for opening said valve sufficiently to introduce enough cold water into said waste water pipe to cool said waste water to a temperature lower than a temperature at which said greasy substances are liquefied whenever the temperature of said waste water at said sensing point exceeds a threshold temperature to prevent said greasy substances from being flushed from said grease trap.

2. The apparatus of claim 1 wherein said temperature sensor is a non-electrical pneumatic type sensor which generates a pneumatic pressure at said sensor in response to changes in the temperature at said sensing point and said control means is a mechanical linkage which operates said valve in response to changes in said pneumatic pressure.

3. The apparatus of claim 1 wherein said temperature sensor is upstream from said mixing point.

4. The apparatus of claim 3 wherein said temperature sensor is a non-electrical pneumatic type sensor which generates a pneumatic pressure at said sensor in response to changes in the temperature at said sensing point and said control means is a mechanical linkage which operates said valve in response to changes in said pneumatic pressure.

5. The apparatus of claim 3 wherein said waste water pipe further comprises a thermally insulating section between said mixing area and said temperature sensor.

6. The apparatus of claim 5 wherein said temperature sensor is outside of said waste water pipe and is in thermal contact with an outside surface of said waste water pipe.

7. The apparatus of claim 1 wherein said control means is adapted to close said valve whenever the temperature of said waste water in said waste water conduit is below a second threshold temperature lower than said threshold temperature.

8. The apparatus of claim 7 further comprising delay means wherein said control means closes said valve after a selected time interval determined by said delay means after the temperature of said waste water has dropped below said second threshold temperature.

9. The apparatus of claim 8 wherein said time interval is about 10 seconds to 25 seconds.

10. The apparatus of claim 1 further comprising delay means wherein said control means closes said valve after the temperature of said waste water has dropped below said threshold temperature and after a subsequent time interval determined by said delay means.

11. The apparatus of claim 10 wherein said time interval is about 10 seconds to 25 seconds.

12. The apparatus of claim 1 further comprising an air gap coupled between said valve and said waste water conduit.

13. The apparatus of claim 12 further comprising an odour prevention trap coupled between said air gap and said waste water conduit.

14. A method of preventing greasy substances in waste water from being flushed into a sewer line, said method comprising the steps of:
   (a) providing a grease trap and a waste water pipe for carrying waste water containing greasy substances to said grease trap;
   (b) measuring the temperature of said waste water at a point in said waste water pipe upstream from said grease trap;
   (c) adding cold water into said waste water pipe at a location downstream from said point and, upstream from said grease trap whenever the temperature measured in step (a) exceeds said threshold temperature; and
   (d) allowing said cold water to mix thoroughly in said waste water pipe with said waste water before entering said grease trap.

15. The method of claim 14 further comprising continuing said cold water addition for a selected time interval after the temperature of said waste water in said waste water pipe has fallen below said threshold temperature.

16. The method of claim 14 further comprising monitoring said temperature at said point while continuing said cold water addition until said temperature is lower than a second threshold temperature which is lower than said threshold temperature.

17. Apparatus for maintaining the temperature of waste water entering a pease trap from a source of waste water below a threshold temperature, said apparatus comprising:
- (a) a source of waste water contaminated with greasy substances;
- (b) a grease trap spaced away from said source of waste water;
- (c) a waste water conduit extending between said source of waste water and said grease trap, said waste water conduit having an upstream end in fluid communication with said source of waste water and a downstream end in fluid communication with an inlet of said grease trap;
- (d) a temperature sensor in thermal communication with a sensing point in the interior of said waste water conduit, upstream from said inlet, for sensing the temperature of said waste water at said sensing point;
- (e) a cold water supply conduit connectable to a cold water supply;
- (f) a normally dosed valve connected between said cold water supply conduit and said waste water conduit for controllably introducing cold water from said cold water supply into said waste water pipe at a mixing area upstream from said grease trap;
- (g) control means associated with said temperature sensor and said valve for opening said valve whenever the temperature of said waste water at said sensing point exceeds said threshold temperature; and
- (h) a thermally insulating section in said waste water conduit between said mixing area and said temperature sensor.

18. Apparatus for preventing greasy substances in waste water from reaching a sewer, said apparatus comprising:
- (a) a source of waste water contaminated with greasy substances;
- (b) a grease trap separated from said source of waste water for removing said greasy substances from said waste water;
- (c) a pipe having an upstream end connected to said source of waste water and a downstream end connected to said grease trap; and
- (d) non-electrical apparatus for cooling said waste water to a temperature lower than a threshold temperature before said waste water enters said grease trap, said apparatus comprising:
  - i) a cold water supply;
  - ii) a normally dosed valve having an inlet connected to said cold water supply;
  - iii) a downwardly projecting nozzle on an outlet of said valve;
  - iv) an upwardly projecting funnel below said nozzle separated from said nozzle by an air gap;
  - v) a cold water supply conduit connected between said funnel and a mixing area in said pipe upstream from said grease trap;
  - vi) a water-containing trap in said cold water supply conduit below said funnel;
  - vii) a thermally conductive area in a lower wall of said pipe upstream from said mixing point;
  - viii) a non-electrical pneumatic type temperature sensor in thermal contact with an outer surface of said thermally conductive area;
  - ix) a mechanical linkage for opening said normally closed valve in response to an increase in a pneumatic pressure in said temperature sensor past a threshold pressure corresponding to said threshold temperature; and
  - x) delay means operatively associated with said temperature sensor, said mechanical linkage and said valve for maintaining said valve open for at least several seconds after a temperature of said waste water at a point in said pipe adjacent said temperature sensor falls to a temperature less than said threshold temperature.

* * * * *